April 30, 1963  J. N. BORRAS  3,087,842
METHOD FOR THE MANUFACTURE OF PISTON RINGS
Filed Jan. 21, 1960  2 Sheets-Sheet 1
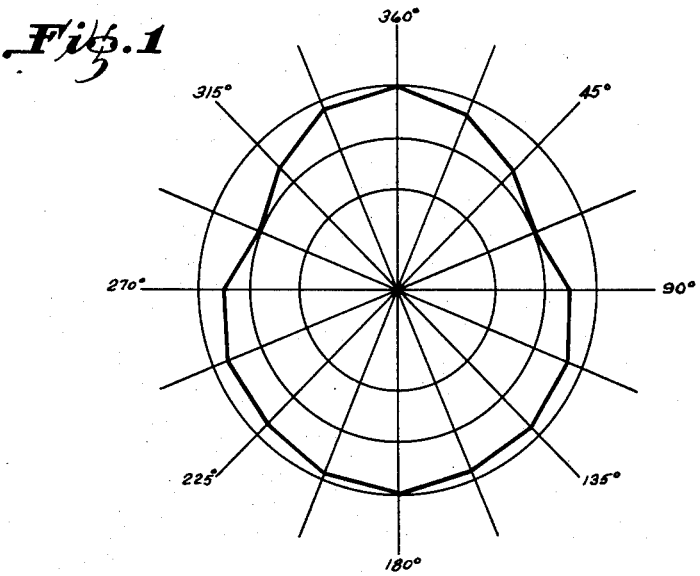
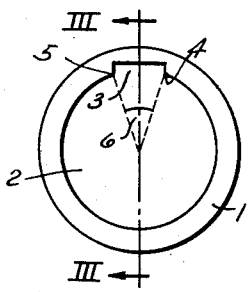
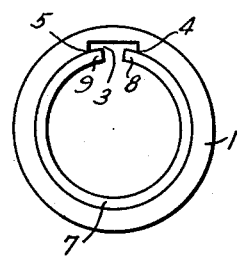
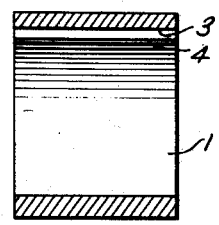
INVENTOR
JOSE NADAL BORRAS
BY Richards & Geier
ATTORNEYS

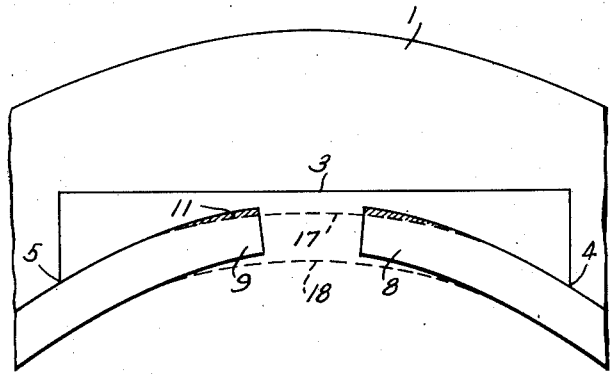
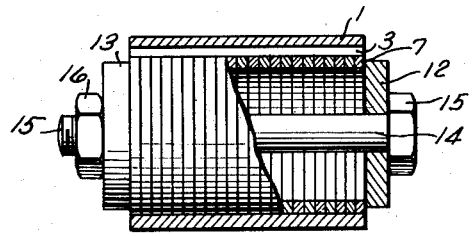
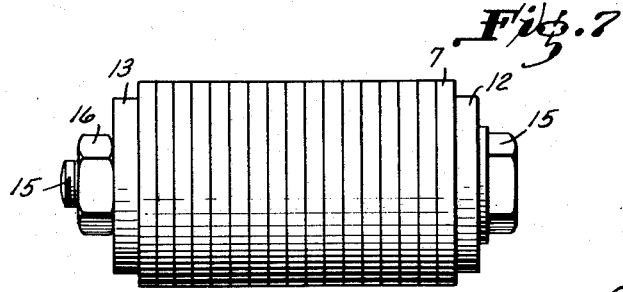

United States Patent Office 3,087,842
Patented Apr. 30, 1963

3,087,842
METHOD FOR THE MANUFACTURE OF PISTON RINGS
Jose Nadal Borras, Villanueva y Geltru, Spain, assignor to Fundiciones Industriales Sociedad Anonima, Barcelona, Spain
Filed Jan. 21, 1960, Ser. No. 3,934
Claims priority, application Spain Feb. 9, 1959
2 Claims. (Cl. 148—3)

This invention concerns piston rings.

Conventional rings, when employed in an aluminum cylinder plated with hard chromium, cause substantial wear of the chromium layer of the cylinder, and this results in loss of compression and efficiency.

Tests carried out on piston rings according to this invention show that they prevent wear on such chromium cylinder layer.

The piston rings made by the method according to the invention are distinguished from the prior conventional rings by their hardness which is above 400 Brinell, as compared with standard piston rings which are usually of a hardness not greater than 280 Brinell.

A hardness of 400 Brinell can be imparted to conventional piston rings by quenching and tempering, but rings so hardened are brittle and are virtually useless since they are subject to a high incidence of breakage during fitting onto a piston. Moreover, rings tempered in this way do not maintain their elasticity at engine working temperatures and lose their capacity to perform their fundamental function, namely, to seal the piston relative to the cylinder.

Thus, an object of the invention is to render possible the provision of piston rings of hardness of 400 Brinell or more, whilst maintaining the physical and mechanical properties thereof, namely strength and insensitivity to engine working temperatures, so that neither the tensile strength nor the hardness are impaired; the invention concerning the whole industrial process, that is, from the making up of special iron alloys to the complete machining thereof.

The procedure followed in order to obtain a material showing all the best qualities necessary to get top-quality rings is as follows:

The raw piston rings can be obtained either by casting individual rings, or by cutting them off sand- or centrifugally-cast cylinders.

The composition of the alloy is very slightly different according to whether the rings are cast individually or as a cylinder which is subsequently divided, due to the need to vary the elements which govern the formation of graphite, reconciling these with the specific cooling velocity of the respective casting method adopted, but certain elements constitute key or basic elements and are essential within predetermined limits, in order to obtain the desired hardness, strength and temperature insensitivity in the final product.

These key elements are:

| | |
|---|---|
| Silicon | Not more than 3% in any case. |
| Phosphorus | Not more than 0.50% in any case. |
| Chromium | Not less than 0.60%. |
| Molybdenum | Not less than 0.60%. |

Keeping within these limits, preferred iron alloys for the piston rings, according to the method of casting involved, are as follows.

(a) For casting individual rings:

| | Percent |
|---|---|
| Carbon | 3.30 |
| Silicon | 2.30 |
| Phosphorus | 0.20 |
| Chromium | 0.60 |
| Manganese | 0.50 |
| Molybdenum | 0.60 |
| Sulphur | 0.05 |

(b) For casting cylinders to be divided into piston rings:

| | |
|---|---|
| Carbon | 3.30 |
| Silicon | 2.20 |
| Phosphorus | 0.20 |
| Chromium | 0.70 |
| Manganese | 0.50 |
| Molybdenum | 0.70 |
| Sulphur | 0.05 |

With these alloy compositions, it is necessary to obtain the following characteristics in the raw cast material.

(a) In the individually cast rings:
  Hardness—107 to 113 Rockwell B.
  Structure—matrix of fine pearlite and troostite with dissemination of carbides and fine graphite, and contingently acicular bainite.

(b) In rings obtained by dividing a cast cylinder:
  Hardness—250 Brinell.
  Structure—matrix of fine pearlite and dissemination of carbides and fine graphite, and contingently troostite and acicular bainite.

The individual rings or the cylinders, after casting, are subjected to thermal treatment by heating at 900° C. for two hours and quenching in oil.

To get proper final results, the thus hardened material must have the following characteristics:

Hardness _____ Not less than 52 Rockwell C.
Structure _____ Matrix of fine martensite.

The cast pieces, so hardened are then tempered at the temperature of 300° C. to eliminate internal stresses therein, to render the pieces readily workable or machinable and to reduce the brittleness thereof.

After this treatment, the cast pieces should exhibit a modified structure, having the following characteristics:

Hardness—Not less than 46 Rockwell C.
Structure—Needle-shaped or accicular matrix with dissemination of carbides and fine graphite.

The subsequent machining of the cast pieces follows for the most part, the conventional steps involved in machining of prior known piston rings, with the exception of the step of cutting or gapping the ring to obtain the tension necessary in operation. Therefor the prior known procedures cannot be adopted because they do not provide the requisite tension distribution to ensure correct pressure distribution of the ring in the engagement with a cylinder wall. Thus, the usual methods of opening either by hammering on the internal surface of the ring or by the so-called "levering out" (known in the German language as "Formdrehen") alone are not suitable. Such conventional methods result in the impairment of the elasticity of the rings at engine working temperatures and consequent compression losses.

On the other hand, the machining hereinafter described, enables the tensions in the ring to be maintained with consequent maintenance of the desired pressures of the ring on its cylinder walls.

In carrying into effect the preferred method according to the invention here described, the rings are machined on both their flat and cylindrical surfaces, and are gapped by cutting away an amount equal to about 5.6 to 6% of the diameter thereof and opening the gap until its extent is approximately equal to 14 to 15% of the diameter of the ring, this opening being effected at a temperature from 460 to 475° during two hours and with the help of an adequate wedge, so as to ensure permanent dilation of the ring.

With the above operation it is possible to give the rings the necessary gap, so that they may have the requisite elasticity while they remain at the same time insensitive to the engine working temperatures.

The material of the rings undergoes further modification during this operation, its structure becoming acicular or needle-shaped whilst its hardness remains not less than 40 Rockwell C.

Although the rings obtained according to the above described method show a suitable elasticity and a stable structure, they do not yet have the desired pressure distribution on the cylinder walls, especially near and at the ring ends.

In order that the invention may be fully understood, it will be described further, reference being made to the accompanying drawings with regard to the machining of the rings. In the drawings:

FIG. 1 is a polar diagram showing the forces exerted upon a cylinder wall by a piston ring according to the invention, FIG. 2 is a diagrammatic end elevation of a sleeve employed in machining piston rings in carrying the invention into effect, FIG. 3 is a fragmentary cross-sectional side elevation of the sleeve of FIG. 2, the section corresponding to the line III—III of FIG. 2, FIG. 4 is a diagrammatic end elevation of the sleeve of FIG. 2, showing a piston ring therein, FIG. 5 is an enlarged diagrammatic fragmentary view corresponding to FIG. 4, FIG. 6 is a part-sectional end elevation of the sleeve showing a number of piston rings clamped therein, and FIG. 7 is an enlarged side elevation showing the clamped-together rings of FIG. 6 removed from the sleeve.

FIG. 1 shows diagrammatically the desirable pressures between the piston rings and the respective cylinder walls for efficient functioning of the ring in the form of a polar diagram, and in order to approximate as closely as possible thereto, the cast rings, or the rings cut off from a cast cylinder are treated as follows:

Firstly, the rings, indicated by reference numeral 7 in the drawings, are contracted slightly and are located into a bushing or sleeve 1 (FIGS. 2 and 3) which has a longitudinal groove 3 in its inner curved surface. FIGS. 4 and 5 show such rings in position in the sleeve.

The edges 4 and 5 where the groove 3 meets the inner curved surface of the sleeve 1 subtend an angle 6 of 60° at the axis of the sleeve.

The rings are positioned in the sleeve 1 in such a manner that their gaps are disposed at the center of the groove 3, so that each ring abuts by its outer surface against the inner surface of the sleeve 1 except in correspondence with the groove 3 whereat the ends 8 and 9 of the ring 7, due to the contraction of the ring and reaction of the sleeve, tend to be deflected outwardly slightly at 10, 11, from the circular form of the rest of the ring as has been indicated at 17, 18, in FIG. 5.

A plurality of the rings 7 (FIG 6) located in the sleeve are clamped together by means of a bolt 14 passing through collars 12 and 13 disposed one at each end of the ring assembly and tightened by means of a nut 16, whereafter the rigidly clamped rings 7 are withdrawn from the sleeve 1.

As shown in FIG. 7, the rings 7 now constitute a solid entity which can be machined, and this is effected by turning, so as to restore the outer curved surface to a true cylindrical form. This, of course, involves removal of the material of the rings in the regions 10, 11 which are shown shaded in FIG. 5, and the rings so formed give a pressure diagram conforming substantially to that of FIG. 1.

What I claim is:

1. A method of casting piston rings, comprising in combination the steps of preparing an alloy containing by weight carbon 3.3%; manganese 0.5%; sulphur 0.05%; silicon at most 3%, chromium at least 0.6%, molybdenum at least 0.6%, phosphorus at most 0.5%, the rest being iron; casting said alloy to form a ring the structure of which is within the range consisting of a matrix of a fine pearlite and dissemination of carbides and fine graphite, the hardness of the ring being 107 to 113 Rockwell B; then heating the ring at a temperature of between 900° C. and 950° C. for a time period ranging between one to three hours and quenching the ring in oil to provide a hardened ring having a structure of a matrix of fine martensite and a hardness of at least 52 Rockwell C; then tempering the hardened ring at a temperature of between 250° C. and 350° C. to form a ring structure consisting of an acicular matrix with dissemination of carbides and fine graphite; thereafter cutting the ring to form a gap amounting to from 5.6% to 6% of the diameter of the ring; spreading the ends of the ring adjacent said gap until said gap amounts to from 14% to 15% of the diameter of the ring; and then heating the cut ring in the spread position at a temperature ranging between 460° C. and 475° C. to ensure permanent dilation of the ring, the structure of the ring becoming acicular and its hardness remaining at least 40 Rockwell C.

2. A method in accordance with claim 1, comprising the additional steps of circumferentially compressing the uncut portion of the ring, whereby end portions of the ring adjacent said gap will extend radially outwardly, and machining by turning the outer surfaces of the ring while removing parts of said end portions which extend beyond the cylindrical surface of the ring.

References Cited in the file of this patent

UNITED STATES PATENTS

| | | |
|---|---|---|
| 1,284,439 | Pedrick et al. | Nov. 12, 1918 |
| 1,380,136 | Doan | May 31, 1921 |
| 1,951,646 | Butler | Mar. 20, 1934 |
| 2,027,116 | Oubridge | Jan. 7, 1936 |
| 2,181,947 | McCarroll | Dec. 5, 1939 |
| 2,417,610 | Phillips | Mar. 18, 1947 |
| 2,763,545 | Breeler | Sept. 18, 1956 |
| 2,811,762 | Mayfield | Nov. 5, 1957 |
| 2,895,859 | Peras | July 21, 1959 |

FOREIGN PATENTS

| | | |
|---|---|---|
| 467,159 | Great Britain | June 9, 1937 |